United States Patent [19]

Sigerist

[11] Patent Number: 5,032,206

[45] Date of Patent: Jul. 16, 1991

[54] APPARATUS AND METHOD FOR APPLYING AN OVERLAY TO A CURVED SURFACE

[75] Inventor: Helmut Sigerist, Fort Langely, Canada

[73] Assignee: VTI Veneer Technology, Tacoma, Wash.

[21] Appl. No.: 289,328

[22] Filed: Dec. 23, 1988

[51] Int. Cl.⁵ .............................................. B32B 31/20
[52] U.S. Cl. ...................................... 156/358; 100/48; 100/237; 144/352; 156/212; 156/323; 156/360; 156/475; 156/477.1; 156/581
[58] Field of Search ................... 156/212, 477.1, 475, 156/583.91, 581, 356, 357, 323, 358, 351, 360; 144/346, 352; 100/48, 237

[56] References Cited

U.S. PATENT DOCUMENTS

| | | | |
|---|---|---|---|
| 2,711,776 | 6/1955 | Woodburn | 156/581 |
| 2,744,564 | 5/1956 | Woodburn | 156/477.1 X |
| 2,782,818 | 2/1957 | Christeson | 156/583.91 X |
| 2,993,824 | 7/1961 | Richaudeau | 156/285 |
| 3,338,767 | 8/1967 | Fuller | 156/581 X |
| 3,686,051 | 8/1972 | Samuel et al. | 156/212 |
| 4,052,246 | 10/1977 | Albareda et al. | 156/412 |
| 4,081,304 | 3/1978 | Bruseschi | 156/477.1 X |
| 4,220,492 | 9/1980 | Lenhardt | 156/358 |
| 4,447,282 | 5/1984 | Valerio et al. | 156/475 X |
| 4,564,408 | 1/1986 | Crumbach | 156/581 X |
| 4,614,555 | 9/1986 | Smith et al. | 156/356 X |
| 4,648,934 | 3/1987 | Kiss | 156/323 X |
| 4,740,417 | 4/1988 | Tornero | 156/285 X |
| 4,750,965 | 6/1988 | Pippel et al. | 156/574 X |
| 4,869,774 | 9/1989 | Wisbey | 156/574 X |

FOREIGN PATENT DOCUMENTS 3011171  3/1980  Fed. Rep. of Germany ...... 144/352

Primary Examiner—Michael W. Ball
Assistant Examiner—Michele K. Yoder
Attorney, Agent, or Firm—Kolisch, Hartwell, Dickinson, McCormack & Heuser

[57] ABSTRACT

A press for applying an overlay to a substrate which includes multiple, individually reciprocal and selectively controlled depressers actuatable to force the overlay in a progressively expanding area against the surface of the overlay.

1 Claim, 3 Drawing Sheets

APPARATUS AND METHOD FOR APPLYING AN OVERLAY TO A CURVED SURFACE

BACKGROUND AND SUMMARY OF THE INVENTION

This invention relates to an apparatus and method for applying an overlay, such as an overlay of veneer, to a curved surface, such as the curved surface which typifies the outer surface of a molding strip and like elements.

Applying overlays to a workpiece is useful and desirable in a number of applications. For instance, such might be applied to a metal element to impart to the element the appearance of wood and where metal is selected for the composition of the element because of fire resistance or other desirable properties. As another example, a veneer overlay might be applied to a workpiece where the workpiece is composed of an inferior grade. or species of wood, or perhaps a particle board type of material, to impart to the finished product a better appearance. This is a particularly important use of veneer overlays at the present time where the world supply of quality wood is diminishing.

An element, such as a piece of molding strip, a door jamb, trim material, etc. very frequently will be provided with an exterior surface which is substantially straight extending in a direction paralleling the longitudinal axis of the strip, but which in transverse cross section extends in a curving expanse, with this curving expanse delineating valleys and ridges joined by irregularly curved surface regions. Because of the complex curvature involved, there are problems connected with applying an overlay to such a surface, with the overlay during the application process tending to be stretched and cracked when making it properly conform to the substrate that it is to cover. Additionally, proper bonding of the overlay to the workpiece or substrate is a problem by reason of inadequate pressure being applied to the overlay in all regions that the overlay is to contact the substrate. Another problem that a manufacturer encounters is that the contours of different workpieces will vary, and a press designed to accommodate one style of contouring is not easily changed to make it suitable for applying overlays to another style of contouring.

A general object of this invention is to provide an improved press for applying an overlay to a workpiece or substrate which is operable to conform the overlay to the curvature of the substrate surface in a manner minimizing stretching, breaking, cracking, etc.

Another object is to provide such a press which is relatively flexible in operation, in the sense that it is relatively easily adjusted to accommodate different contours in the exterior surfaces of a substrate.

A further object is to provide an overlay applying press which features what are referred to herein as multiple depressers, each individually and selectively movable to produce at their extremities and when actuated, pressure in localized regions of an overlay against the substrate to which it is applied.

Yet a further object of the invention is to provide a novel method for applying an overlay to the outer surface of a workpiece, wherein lineal pressure regions of limited lateral extent are produced with such pressure regions paralleling the longitudinal axis of the workpiece, the pressure regions being successively established in a manner dictated by the particular contour being surfaced.

BRIEF DESCRIPTION OF THE DRAWINGS

These and other objects and advantages are attained by the invention, which is described hereinbelow in conjunction with the accompanying drawings, wherein.

DETAILED DESCRIPTION OF A PREFERRED EMBODIMENT

Figure 1:
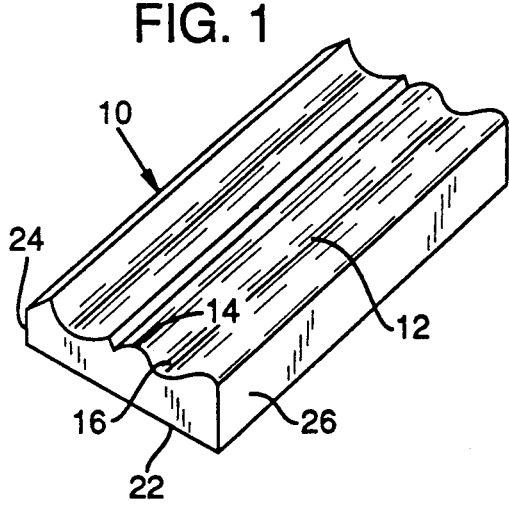
FIG. 1 is a perspective view showing portions of a workpiece such as might be overlayed using the invention.

Illustrated in FIG. 1 is an elongate workpiece 10 representative of a typical element that it is desired to cover with an overlay, such as a veneer overlay. The workpiece has a front or face surface 12, which appears in a cross-sectional view of the workpiece taken across its longitudinal axis extending as a curving expanse, with ridges 14 and valleys 16 joined by convexly and concavely curving regions. The workpiece has a back surface 22 opposite its front surface 12, and edge surfaces 24 and 26 delineating opposite side margins of the workpiece. In a typical overlaying process, it might be desirable to cover with a veneer overlay not only the front surface, but also edge surfaces 24, 26.

The curvature described is usually uniform along the length of the workpiece. Thus, the front surface in a cross-sectional view which parallels the axis of the workpiece would appear as substantially lineal.

Figure 2:
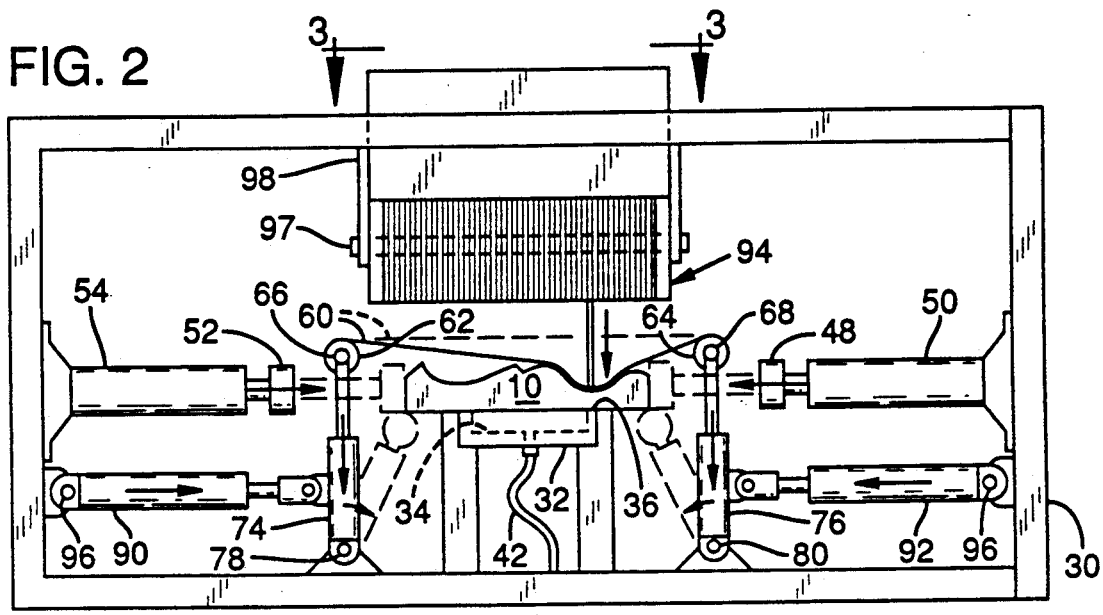
FIG. 2 is an end elevation of apparatus constructed according to the invention.

To produce an overlay on such a workpiece and referring to FIG. 2, apparatus is provided which includes a frame 30, and suitably supported on this frame what is referred to as a workpiece support 32. The end of the workpiece support is shown in FIG. 2, but it should be understood that the support has substantial extent in a longitudinal direction, normally at least equaling the length of the workpiece being processed.

The workpiece support includes an elongate channel 34 extending along the top thereof. The channel is bounded by shoulders 36 which the workpiece rests on. The channel is not as long as the workpiece, so that when a workpiece is placed on the support, its back surface closes off the top of the channel. A vacuum line 42 connected to a suitable vacuum source 43 (FIG. 6C) and controlled by a valve 44 supplies a vacuum to channel 34. When a workpiece, such as workpiece 10, is placed on the element 32 with its back surface resting on the element, by introducing a vacuum to channel 34 which underlies the workpiece, the workpiece is drawn tightly against element 32 to be anchored thereon.

Shown at 48 (FIG. 2) is the end of an elongate indexing shoulder element which substantially parallels element 34. The shoulder element is movable laterally between an indexing position (shown in dashed outline) and a retracted position (shown in solid outline) through extension and contraction of a bank of fluid-operated rams mounted on frame 30 and extending along one side of the apparatus, as exemplified by the end ram in such bank illustrated at 50.

Disposed opposite shoulder element 48 is an elongate workpiece positioner 52 (the end of which appears in FIG. 2) which also parallels element 34. Positioner 52 is shiftable laterally through extension and contraction of a bank of frame-mounted fluid-operated rams, such as ram 54. The function of positioner 52 is to bear firmly against an edge margin of the workpiece whereby its opposite edge margin firmly contacts shoulder element 48, but not with such a force as to produce displacement of shoulder element 48 which is indexing the position of the workpiece. This may be accomplished, either through using a lower pressure fluid to produce extension of the rams 54, or by using rams 54 of somewhat smaller size than the rams which position element 48.

Shown at 60 in FIG. 2 is a flexible forming sheet, which may, by way of example, be made of an elastomer material with a fabric reinforcement. The sheet is maintained in a taut condition overlying the workpiece support with one edge of the sheet being secured to a roller 62 and with margins adjacent this edge extending as wrappings around this roller. The opposite edge of the sheet is secured to roller 64 and margins of the sheet adjacent extend in wrappings around roller 64. The rollers are mounted on shaft assemblies 66, 68, and conventional spring assemblies (not shown) interposed between the shaft assemblies and rollers urge roller 62 to rotate in a counterclockwise direction to produce wrappings on this roller, and roller 64 in a clockwise direction to produce wrappings on this roller.

Shaft assembly 66 has ends at opposite ends of roller 62 supported on the rod portions of fluid-operated rams, such as ram 74, and similarly, shaft assembly 68 has ends at opposite ends of roller 64 supported on the rod portions of fluid-operated rams, such as 76. The cylinder ends of these rams are pivotally supported through pivot means 78 and 80 on frame 30 with the rams being pivotable about axes paralleling channel-shaped element 34.

Fluid-operated positioning rams pivotally supported on frame 30, such as ram 90, are extended and retracted to swing rams 74 between upright and inclined positions, as shown for ram 74 in solid and dashed outline in FIG. 2. Similarly, fluid-operated positioning rams 92 are extended and retracted to swing rams 76. Rams 90, 92 have their cylinder ends pivotally connected, as by pivot means 96, to frame 30.

Figure 3:
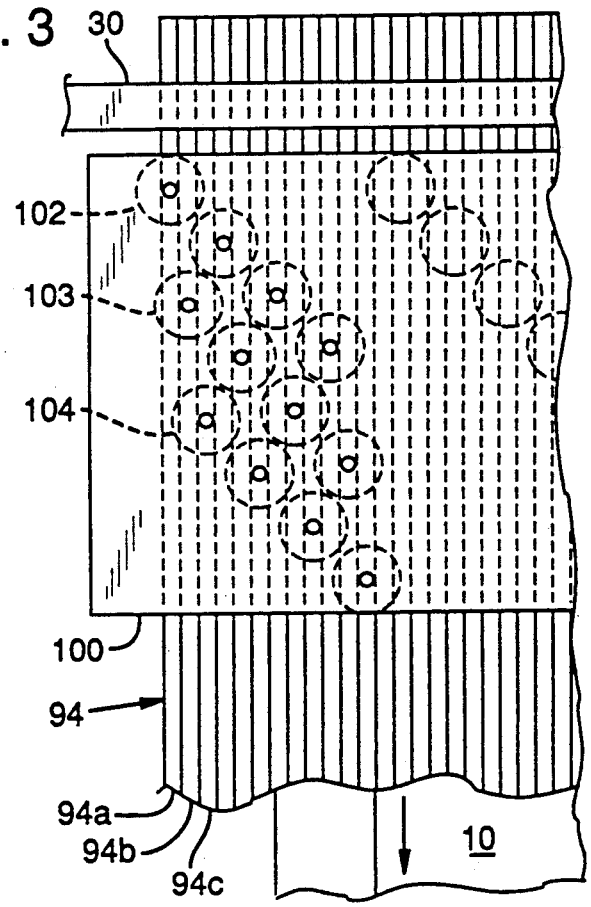
FIG. 3 is a view looking downwardly at portions of the apparatus, as shown in FIG. 2, generally along the line 3—3 in FIG. 2.

Referring to FIGS. 2 and 3, disposed above workpiece support 32 is a bank of elongate thin blades 94, also referred to herein as depressers, with representative individual blades in this bank being illustrated in FIG. 3 at 94a, 94b and 94c. The blades in the bank are disposed side-by-side, with the planes of the blades vertical. Each of the blades or depressers in the bank is mounted for reciprocal movement in a vertical path, the paths of the respective blades being laterally offset from each other, whereby the lower edges or free ends of the blades are movable toward and away from a workpiece supported on the workpiece support. The lower edges or free ends of the blades are surfaced by a ribbon of elastomer material, as shown for blade 94d in FIG. 4 at 95. In a longitudinal direction, i.e., a direction paralleling the length of the workpiece, the blades have a length or longitudinal extent which is at least the length of the workpiece being processed. As shown in FIG. 2, part of the mounting for the blades which accommodates their up and down reciprocal movement may comprise a bar, such as bar 97, supported on struts 98 which are secured to the frame, these bars extending through accommodating slots provided in the blades. This organization of struts and bar may be repeated at spaced intervals along the length of the bank of blades.

Housed within a casing 100 are a multiplicity of fluid-operated rams which are extended and retracted to lower and raise selected ones of the blades or depressers. Thus, and referring to FIG. 2, a ram 102 is provided adjacent one end of blade 94a for raising and lowering this blade. Offset therefrom for clearance purposes is a ram 103 connected to blade 94b. Offset therefrom and connected to blade 94c is a ram 104. The other rams illustrated are connected to other blades and such are similarly offset. While the rams for moving one set of ends of the depressers are illustrated in FIG. 3, it should be understood that another similar bank of rams is provided adjacent the opposite end of the blades or depressers for providing controlled powered movement of the opposite ends of the blades or depressers.

Figure 4:
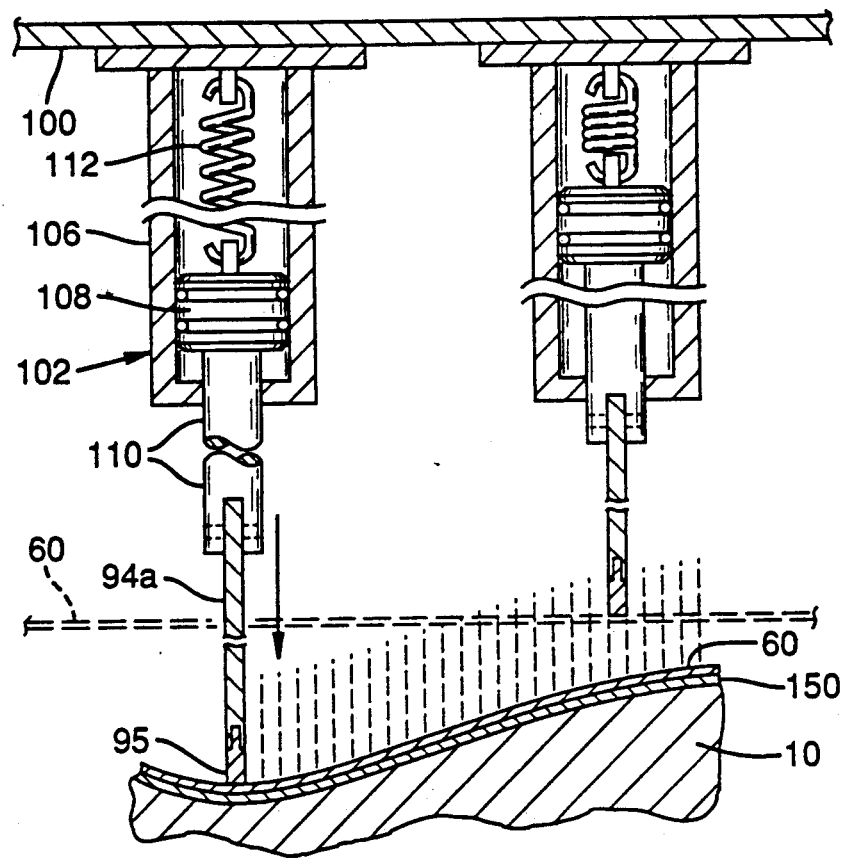
FIG. 4 is a cross-sectional view, on a somewhat enlarged scale, illustrating a pair of depressers in the apparatus and how such are actuated pursuant to the invention.

Referring to FIG. 4 which illustrates in further detail a typical pair of rams, such as might be found in the bank shown in FIG. 3, and considering the ram 102 shown, such includes a cylinder 106, a piston 108 within the cylinder, and a rod 110 which extends from the piston to a connection with a depresser, as exemplified by the depresser 94d. The piston of the ram is biased to be retracted by a spring 112. The cylinder ends of the rams are mounted in a fixed position on the frame of the apparatus.

Figure 5:
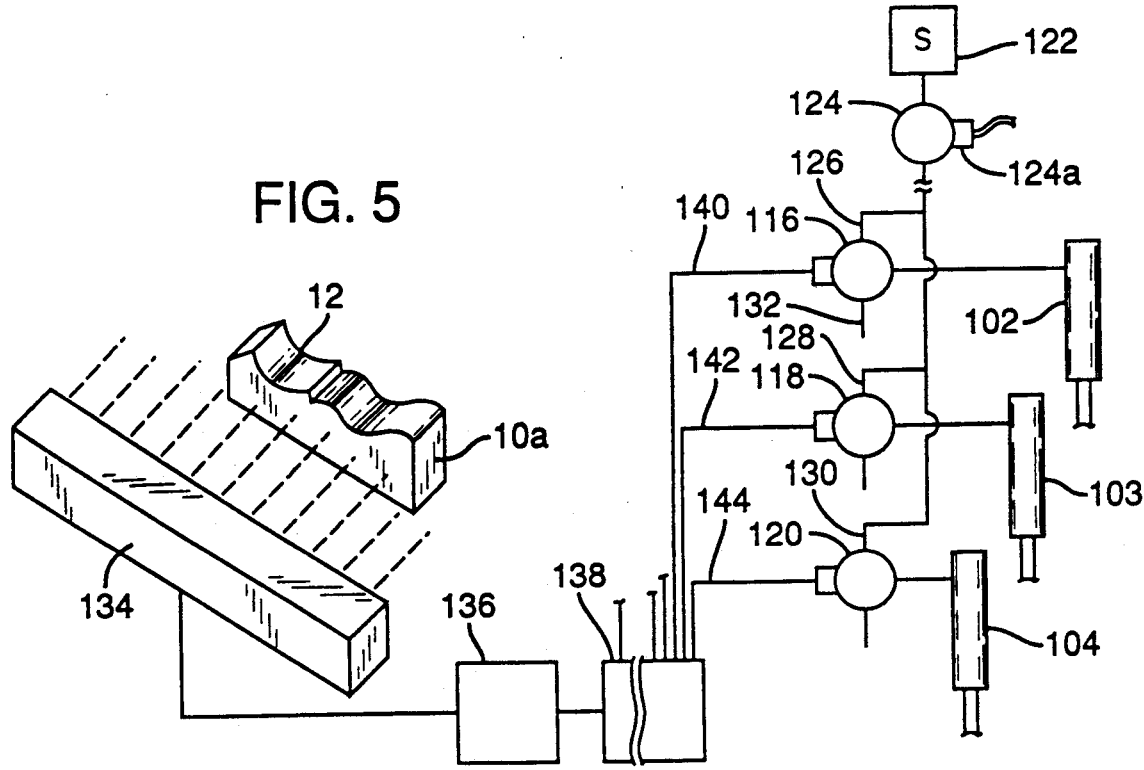
FIG. 5 illustrates a control system for the apparatus.

The rams, such as rams 102, 103, 104 which produce extension and retraction of the depressers, have pressure fluid, such as air under pressure, admitted and exhausted therefrom, as controlled by a control system, such as the one shown in FIG. 5. Referring to FIG. 5, each of the rams has the supply of air under pressure controlled by a solenoid-operated valve, such as the valves shown at 116, 118, 120 for the rams 102, 103, 104. Air under pressure is supplied to the rams from a source 122 which connects through a pressure regulator valve 124 and conduits, such as conduits 126, 128 and 130, with the inlet to the valves 116, 118 and 120. Each valve is adjustable between one position, wherein air supplied to the inlet flows through the valve to pressurize the ram connected therewith, and another position wherein the inlet is cut off and air within a ram is permitted to exhaust, as from an exhaust 132.

Pressure regulator valve 124 is operated by a solenoid, shown at 124a, with the valve in one position of adjustment supplying air at a relatively low pressure to the inlets of the valves 116, 118 and 120, and in another position supplying air at a higher pressure level. While only three of the rams in the bank of rams held within casing 100 are illustrated in FIG. 5, it should be understood that all of the rams included within the bank are controlled in a similar manner.

With continued reference to FIG. 5, the profile of the surface to be covered with the overlay is determined utilizing a scanner 134 which contains bank of light emitters and receptors and which determines, with the array of emitters and receptors directed against the cross-section of a workpiece, such as that shown at 10a, the profile of its front surface 12. This information determined by the scanner is supplied to a signal conditioner 136, and this information in turn is fed to a computer 138. Control signals from the computer are fed to the various solenoid-operated valves by conductors, as shown at 140, 142 and 144.

Figure 6A:
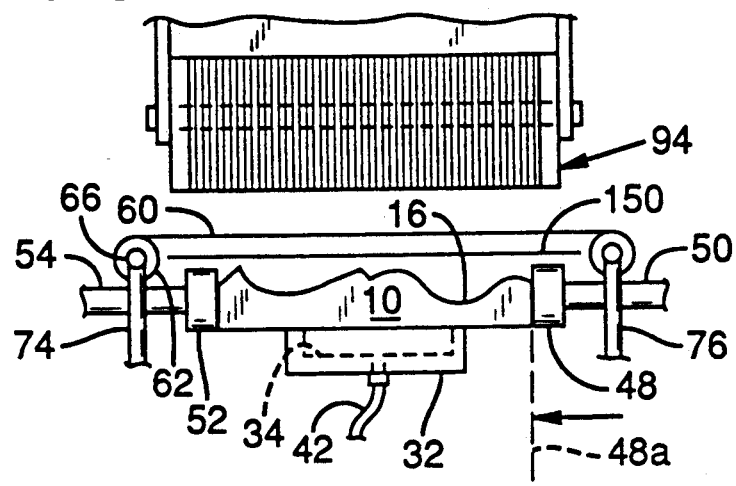
FIGS. 6A, 6B, and 6C are schematic illustrations showing how the apparatus may be employed in the producing of an overlayed product.

Describing the operation of the apparatus, a workpiece, such as workpiece 10, is placed on support 32 and rams 50, 54 actuated whereby indexing shoulder element 48 positions one edge of the workpiece at the location of indexing line 48a shown in FIG. 6A, with positioner 52 urging the workpiece snugly against this indexing line. With the workpiece so positioned, a vacuum is supplied to the workpiece support to anchor the workpiece on the workpiece support. At this time the rams 50, 54 may be contracted to withdraw the indexing shoulder element and workpiece positioner.

Figure 6B:
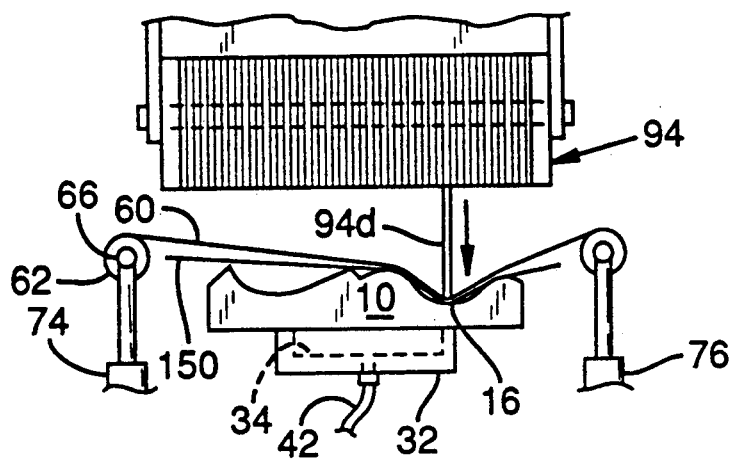

An overlay, such as veneer sheet 150 in FIG. 6A, is then placed over the workpiece between the top surface of the workpiece and forming sheet 60. The top surface of the workpiece and its side margins are coated with adhesive. The rams which control lowering of a single depresser are then actuated to produce lowering of this depresser, with its lower free end or edge pushing before it the sheet 60 and the overlay sheet underneath it against a lineal region of the workpiece 10. In FIG. 6B, this particular depresser is indicated at 94d. Typically, the particular depresser which is actuated, as determined by scanner 134, is that which lies over the base of a valley, such as the one shown at 16 in FIG. 6B. A slightly distributed pressure is exerted by the depresser against the workpiece, by reason of the elastomer material on the free end or edge of the depresser and the inclusion between the depresser and the workpiece of the forming sheet 60.

Figure 6C:
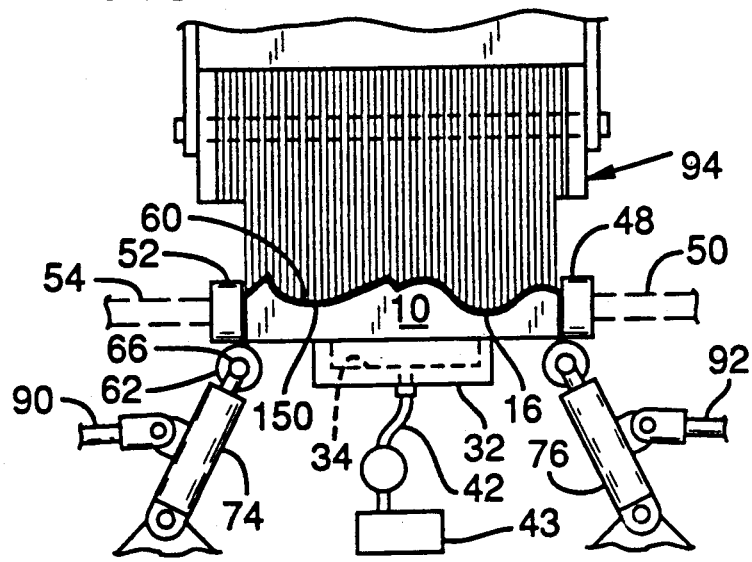

After lowering of the depresser 94d to the extent permitted by the workpiece, depressers located directly to either side thereof are actuated to be lowered. With these depressers reaching a bottomed position, as determined by the contour of the workpiece, depressers to either side of the just lowered depressers are actuated to be lowered. This sequence is followed until all the depressers which overlie the workpiece have been lowered, as illustrated in FIG. 6C. As referred to earlier, forming sheet 60 is maintained in a taut condition overlying the workpiece support. As a consequence, as successive depressors are lowered, the sheet is taut where such extends between the depressors whereby the sheet extends directly between the depressors with the depressors extended and the sheet exerts a pressure between the depressors.

During this sequential lowering of the depressers, the veneer overlay is caused to follow the curving outline of the surface of the workpiece, with the veneer being pressed in lineal regions located progressively farther outwardly from the initial pressure contact region. As successive depressers are lowered, those depressers which previously have already been lowered are maintained in a condition exerting pressure on the overlay.

It is contemplated that this initial positioning of all the depressers will be done utilizing an operating air pressure, as determined by valve 124 illustrated in FIG. 5, with a moderate level of air pressure.

After lowering of all the depressers, cylinders 90, 74 and 76, 96 are actuated to cause the forming sheet 60 to be bent downwardly over the side edge surfaces of the workpiece as shown in FIG. 6C. Pressure regulator valve 124 is adjusted through its solenoid 124a to introduce air under pressure at a higher pressure level to the various rams which have lowered the depressers, whereby the overlay is caused to be pressed more firmly by the depressers against the front surface of the workpiece. Rams 54, 50 may be extended to produce a clamping pressure against the forming sheet where such overlies side edge surfaces 24, 26 through elements 52, 48, but this pressure is at only a slight pressure so as not to disturb the position of the workpiece on the workpiece support.

After completion of the application of the overlay as described, and curing of the adhesive which bonds the overlay to the workpiece or substrate, applicable cylinders in the bank of cylinders which actuate the depressers are caused to be retracted and other cylinders actuated, to cause lifting of all the depressers, return of the forming sheet to a taut condition over the workpiece support, and to position elements 52, 48 in a retracted position within the apparatus.

It will be noted that with the apparatus contemplated, and with the method performed by the apparatus, there is an initial pressing of the overlay against the workpiece or substrate in a lineal region extending the length of the workpiece having limited lateral extent, this region paralleling the longitudinal axis of the workpiece. Subsequently the overlay is pressed in other lineal regions offset from the initial point of contact, with there being a progressive application of pressure in lineal regions progressing away from the initial contact region, which causes the overlay to shape itself to the curved surface being covered, with reduced tendency of the overlay to crack or fracture during the pressure application process.

While an embodiment of the invention has been described, it should be obvious that variations and modifications are possible without departing from the invention.

It is claimed and desired to secure by Letters Patent:

1. In a press for applying an overlay to a workpiece having opposed sides, the improvement comprising:

a workpiece support for supporting a workpiece with a surface of the workpiece exposed, a bank of multiple depressers disposed opposite the exposed surface of the workpiece supported by the workpiece support, the depressers in said bank being successively laterally offset and having work-engaging free ends, the depressers in said bank being mounted for reciprocal movement in laterally offset paths wherein their said free ends are movable toward and away from said workpiece, a power-operated device for each depresser actuatable to produce movement of the depresser in its path, control means for the collective power-operated devices operable to actuate the devices in predetermined sequency whereby selected depressers in predetermined sequence have their free ends moved to bear against the exposed surface of a workpiece in said workpiece support, a flexible sheet and means mounting the sheet with the sheet extending over the surface of the workpiece in a region located between the surface of the workpiece and the free ends of the depressers, the depressers when moved to bear against the workpiece bearing against the workpiece through said sheet, the sheet being sufficiently taut whereby the sheet extends directly between two adjacent depressers with these depressers extended to exert a pressure between the depressers, positioning means actuatable to engage the sides of the workpiece to pre-position the workpiece in a selected position on the support, and workpiece anchoring means engagable with portions of the workpiece other than the exposed surface and sides for anchoring the workpiece in its selected position, the means mounting the sheet being adjustably positionable to wrap the sheet around the sides of the workpiece with the workpiece anchored by said workpiece anchoring means.

* * * * *